UNITED STATES PATENT OFFICE.

HANS STRECKER AUFERMANN, OF MUNICH, GERMANY.

PROCESS FOR PREPARING PRINTING-PLATES IN GRAIN MANNER.

954,412.  Specification of Letters Patent.  Patented Apr. 12, 1910.

No Drawing.  Application filed February 8, 1909. Serial No. 476,758.

*To all whom it may concern:*

Be it known that I, HANS STRECKER AUFERMANN, a subject of the German Emperor, and resident of Munich, Germany, have invented a certain new and useful Process for Preparing Printing-Plates in Grain Manner, of which the following is a specification.

About 1852 Talbot published a method for preparing printing plates in grain manner wherein a steel plate was provided with a coating of glue containing chrome salts, the coating then exposed, developed with water and etched. In place of chrome salt, chrome salt containing arabic gum, albumin, or a mixture of the two was also employed. Later the development for the copy was abandoned, and aqua-tinta grain introduced as a decomposing means for the half tones above the coating. However, Talbot's processes have formed the basis for all similar work up to modern times, only slight modifications and changes being made to meet varying conditions. All the known processes however, show in common a great technical drawback, viz.: the imperfection of decomposition of the half-tones inasmuch as this is caused by the primitive means of the gauze veil or by the aqua-tinta grain which especially for printing in relief can only be obtained with difficulty coarse enough and of sufficient uniformity. To this drawback must be added the increased expense of the separate copying of the gauze veil or of the separate preparing of the aqua-tinta graining. Now, these drawbacks may be removed and prescriptions obtained for preparing printing plates in grain manner which correspond to the requirements of the modern technics, if one does away with the decomposition of the half-tones by copying the gauze veil into the coating or by applying the aqua-tinta grain thereto, and modifies the principle of Talbot's etching of 1858 viz: treating the non developed copy with differently concentrated solutions of ferric chlorid while employing Talbot's salt containing mixture of colloidal substances (glue and arabic gum) in such a manner that in place of the glue, fish glue is employed and if in the chromated mixture of a solution of fish glue and of arabic gum the concentration of the solution of fish glue and the solution of gum as well as the proportion of the amounts used of both solutions are quite definite ones (for instance, such fixed proportions as are hereinafter mentioned); under these conditions the mixture of the solution of arabic gum and the solution of chromated fish glue can be performed in such a manner that the solution of arabic gum separates itself from the solution of chromated fish glue in the shape of small drops and that these small drops after the mixture has been poured on the plate form a regular and clearly visible grain. However as arabic gum, as experiments have shown, resists the etching in a strong solution of ferric chlorid during a long space of time when it is applied in a not too thin layer on a metal plate and when dried, the above cited gum graining after the process of drying has been carried out, completely resists the etching action during the space of time necessary for carrying out the operation of etching so that it is adapted to play during the decomposition of the half-tones, the part of the resisting gauze veil copied into the layer or of the aqua-tinta grain secured thereto by melting.

The above cited conditions of concentration are the following:—For the solution of the arabic gum in water: 1 part of arabic gum to 1–6 parts of water; for the solution of the fish glue in water: 1 part of thick fish glue (containing about 50 per cent. of dry matter) to 2–6 parts of water. The proportions of the mixture for both solutions are the following ones: for 1 part of the solution of arabic gum 1 to 8 parts of the solution of fish glue. The strength of the mixture of chrome salt does not matter for the nucleus of the process; according to the amount and nature of the chrome salt employed only the graduation of the copies is changed. Nor does it matter if the chrome salt is added to the gum solution or to the fish glue solution before the mixture of both has been performed or if the chrome salt is added only after the mixture of the non chromated solutions has been carried out.

As arabic gum is a substance which is relatively expensive, and on the other hand a relatively high concentration of the solution cannot be avoided, it is recommended to replace the arabic gum partially by such bodies which, like the arabic gum, are adapted to resist the action of the etching, or to tan the arabic gum in the well known manner before mixing it with the fish glue. Such a tanning, which may be carried out for instance by mixing the solution of gum with a solution of chrome alum is so efficient that for etchings which do not last long the strength of the gum can even be reduced still further than indicated above. For partially replacing the arabic gum one may employ the cheaper kinds of gum and mucilage as well as all rosins, paraffin, wax, solid, or soft, liquid fat (oil) and so on. These substances are dissolved in a hot or cold state according to their respective propensities for dissolving in alcohol, acetone or another organic solvent, which can be mixed with water and are then incorporated into the solution of gum by stirring, shaking or the like. These substances form with the solution of gum a kind of emulsion in which the particles of the substances are suspended in a state of finest division. As to the amount it is recommended to add to the solution of gum about 1% to 5% of substitute substances calculated for the dry weight of the arabic gum.

With a view of giving lasting properties to the solution of gum or the solution of fish glue or of the mixture of both, it appears to be advantageous to add antiseptics to these solutions such as for instance salicilic acid, alcohol, thymol and so on. The easy distribution of the mixture of liquids can be facilitated by adding certain indifferent substances such as for instance albumin. The danger of drying the layer too far is prevented by a small addition of glycerin, grape sugar or the like. The graduation can be controlled by adding if judged necessary a little inactive coloring matter.

When the mixture of the solution of gum and the solution of fish glue whereto the above cited other substances have perhaps been added, has been performed by shaking, stirring or another operation insuring the intimate mixing of the substances, the mixture is poured on the metal plate and dried either in the well known manner in the centrifugal apparatus or on a leveled support. The drying temperature should not be higher than 60 degrees C. with a view of preventing decompositions. When the layer is dried copying is carried out under the half-tone negative or half-tone diapositive and afterward the plate is at once etched without being developed first. The etching has to be carried out as above stated according to Talbot's principle in solutions of ferric chlorid having different strengths and a concentration which is higher than 30° Bé. The etching could also be carried out according to the process described in my prior patent No. 909,831, January 12, 1909. In the one case as well as in the other one, the arabic gum, in opposition to the fish glue which is bit through by the etching liquid, perfectly resists the etching action until the etching operation is entirely finished.

What I do claim as my invention, and desire to secure by Letters Patent, is:—

1. A process for preparing printing plates in grain manner, consisting in preparing a chromated mixture of a solution of glue, and an aqueous solution of arabic gum, coating a metal plate with said mixture, allowing the plate to rest so as to permit drops of the gum solution to settle in the said mixture of arabic fish glue solutions, drying the coating, exposing the plate, and etching the same, said drops of the gum solution resisting the action of the etching medium.

2. A process for preparing printing plates in grain manner for monochrome and polychrome printing consisting in preparing a chromated mixture of a solution of fish glue having a concentration varying between 1:2 and 1:6 and an aqueous solution of arabic gum having a concentration varying between 1:1 and 1:6, the proportions of mixing both solutions varying between 1:1, and 1:8, spreading the mixture as a coating over a metal plate, leaving the plate at rest so as to cause small drops of the arabic gum solution to settle in the said mixture of arabic gum and fish glue solutions, causing the said coating to dry so as to render the said drops of arabic gum resisting to the action of the etching, exposing the plate under a suitable image and directly etching the plate thereafter, with solutions of ferric chlorid, substantially as and for the purpose set forth.

3. A process for preparing printing plates in grain manner for monochrome and polychrome printing, consisting in preparing a chromated mixture of a solution of fish glue, the concentration of which varies between 1:2 and 1:6, and an aqueous solution of arabic gum, the concentration of which varies between 1:1 and 1:6, and wherein a part of the arabic gum has been replaced by another substance adapted to resist the action of the etching, the proportion of the said solutions in the mixture varying between 1:1 and 1:8, coating with this mixture a metal plate, leaving the metal plate thus coated at rest, drying the said coating, exposing the coated plate under a suitable image and etching it directly after the exposure, with solutions of ferric chlorid, substantially as and for the purpose set forth.

4. A process for preparing printing plates in grain manner for monochrome and polychrome printing, this process consisting in preparing a chromated mixture of a solution of fish glue, the concentration of which varies between 1:2 and 1:6 and an aqueous solution of arabic gum the concentration of which varies between 1:1 and 1:6 and in which the arabic gum has been tanned by a suitable tanning agent, the proportion of said solutions in said mixture varying between 1:1 and 1:8, coating a metal plate with this mixture, leaving the metal plate thus coated at rest, drying the coating of the metal plate, exposing the coated plate under a suitable image and etching it directly after the exposure by means of solutions of ferric chlorid, substantially as and for the purpose set forth.

In testimony whereof I have hereunto set my hand in presence of two witnesses.

HANS STRECKER AUFERMANN.

Witnesses:
MATHILDE K. HELD,
LOUIS I. MUELLER.